May 27, 1947.  H. N. OTT  2,421,126
MICROSCOPE
Filed Aug. 25, 1943   3 Sheets-Sheet 1

INVENTOR
Harvey N. Ott
BY
Parker Prochnow & Farmer
ATTORNEYS

May 27, 1947.  H. N. OTT  2,421,126
MICROSCOPE
Filed Aug. 25, 1943  3 Sheets-Sheet 2
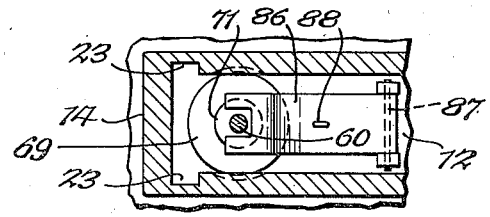
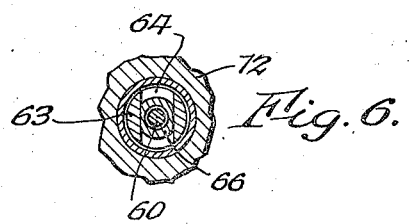
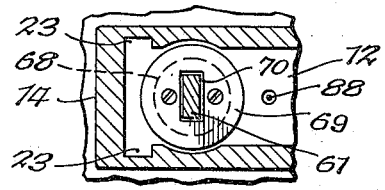
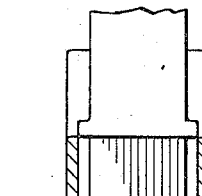
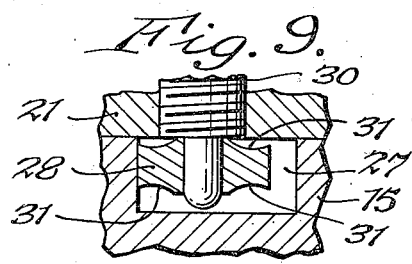
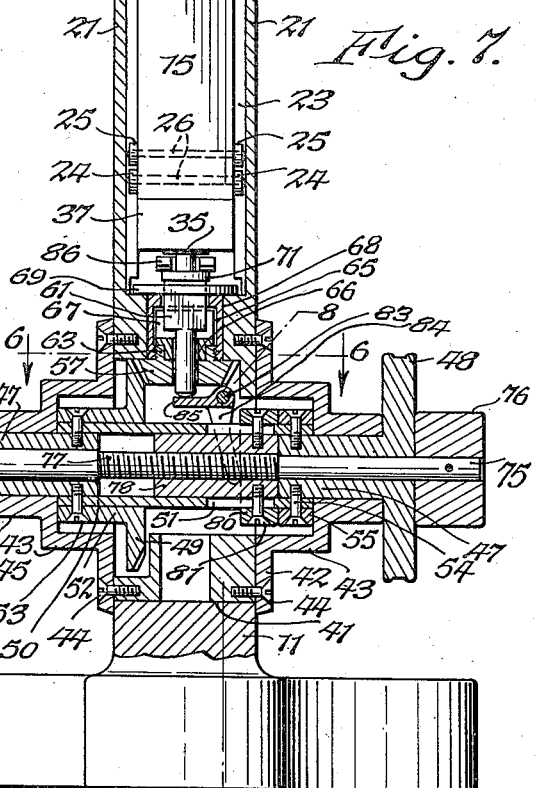
INVENTOR
Harvey N. Ott
BY
Parker Prochnow & Farmer
ATTORNEYS

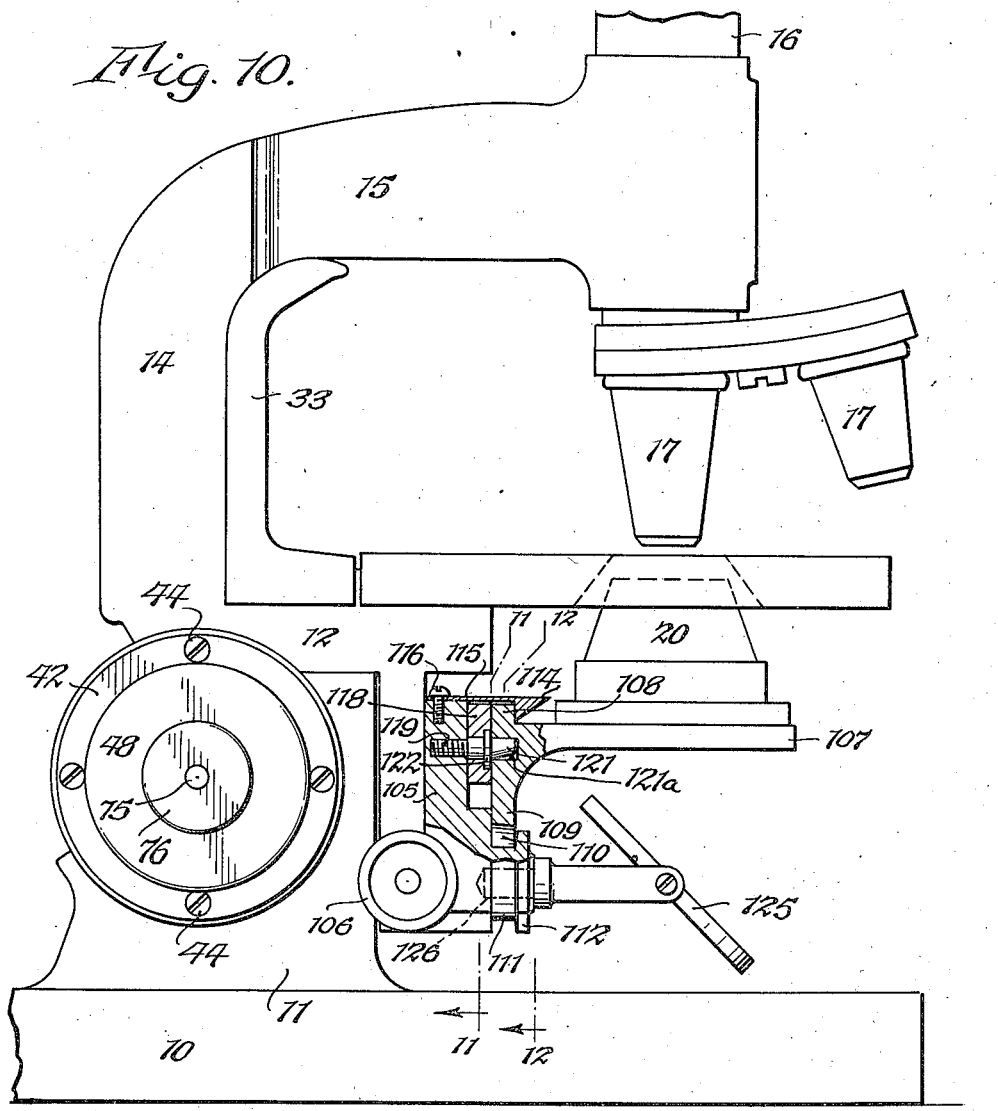

Patented May 27, 1947

2,421,126

UNITED STATES PATENT OFFICE 2,421,126

MICROSCOPE

Harvey N. Ott, Buffalo, N. Y.

Application August 25, 1943, Serial No. 499,929

11 Claims. (Cl. 88—39)

This invention relates to improvements in microscopes, and more particularly to means for adjusting the body tube of a microscope relatively to the object or specimen.

One of the objects of this invention is to provide a microscope having both the fine and coarse adjustment buttons or disks located below the level of the stage and concentric with each other, so that the operator may make both adjustments while his hand rests upon the table or support on which the microscope stands.

Another object is to provide a microscope with means of improved construction for effecting both fine and coarse adjustments of the body tube.

A further object is to provide fine and coarse adjustment mechanism of this type which effect adjustment of the body tube along a single bearing common to both adjustments.

A further object is to provide adjustment mechanisms of this kind in which both fine and coarse adjustment buttons or disks are mounted in fixed relation to the base of the microscope.

It is also an object of this invention to provide mechanisms of this kind in which the fine and coarse adjustment buttons or disks are concentric with each other and with the inclination axis of the microscope.

Another object is to provide an improved mounting for the inclination joint and the fine and coarse adjustment shafts of the microscope.

A further object is to provide a microscope of this type in which the coarse adjustment of the body tube is effected by means of a screw.

It is also an object to provide a microscope of this type with bearing means of improved construction.

Other objects and advantages of this invention will be apparent from the following description and claims.

Some of the subject matter herein disclosed is more particularly set forth and claimed in my copending application Ser. No. 491,931, filed June 23, 1943, now Patent No. 2,263,080, dated November 21, 1944.

In the accompanying drawings:

Fig. 1 is a side elevation, partly in section, of a microscope embodying this invention.

Figs. 2 and 3 are fragmentary sectional plan views thereof, on lines 2—2 and 3—3, Fig. 1.

Figs. 4 and 5 are fragmentary sectional plan views thereof, on lines 4—4 and 5—5 respectively of Fig. 1.

Fig. 6 is a fragmentary sectional plan view thereof, on line 6—6 of Fig. 7.

Fig. 7 is a sectional elevation thereof, on line 7—7, Fig. 1.

Fig. 8 is a fragmentary sectional elevation thereof, on line 8—8, Fig. 7.

Fig. 9 is a fragmentary enlarged sectional view, on a portion of line 2—2, Fig. 1.

Fig. 10 is a side elevation of my improved microscope, partly in section, to show a modified construction for mounting sub-stage parts thereon.

Figure 1:
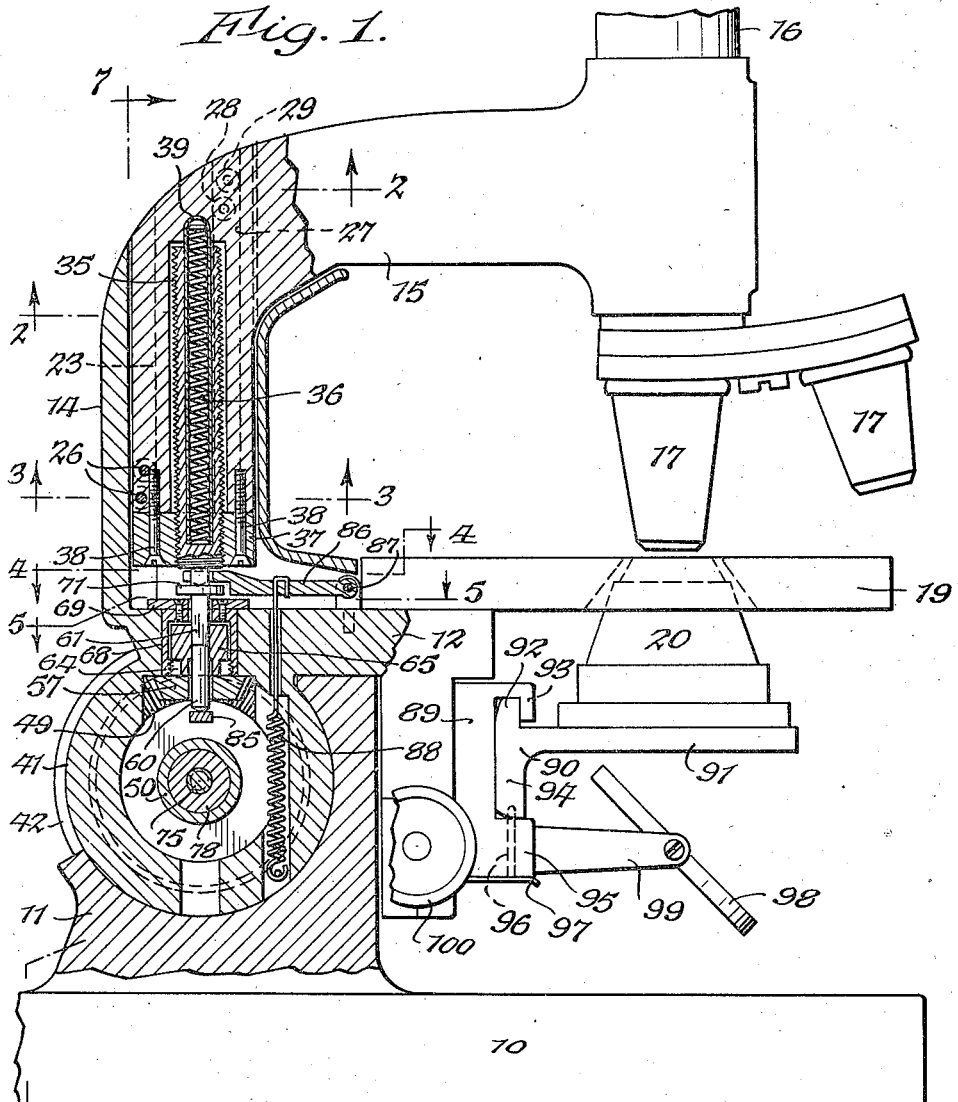

Figs. 11 and 12 are sectional elevations thereof on lines 11—11 and 12—12 respectively, Fig. 10.

In the particular embodiment of my invention shown in the accompanying drawings, 10 represents the base of the microscope which may be of any usual or suitable form and which has an upwardly extending pillar 11 on which the main frame 12 of the microscope is mounted by means of an inclination joint to permit the frame of the microscope to be tilted to various degrees for the convenience of the user. The main frame includes an upwardly extending part or projection 14 on which the arm 15 of the microscope is slidable. This arm supports the body tube 16 and one or more objectives 17 which may be of any suitable or desired construction and which are consequently not shown in detail in the drawings. The microscope also includes a stage 19 which is securely mounted on the main frame 12, and 20 represents a condenser for projecting light to the object supported on the stage. Since the structure of the body tube, objectives, stage and condenser is not a part of this invention, they are not shown in detail.

Figure 3:
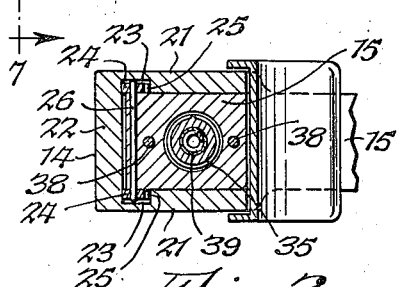
Figure 2:
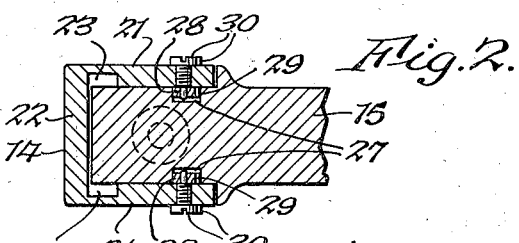

The bearing for mounting the arm 15 of the microscope on the main frame may be of any usual or suitable type, and in the construction shown in Figs. 1 to 3, the upward extension 14 of the main frame is of channel shape and has a pair of side walls 21 extending rearwardly from the front wall 22 of the extension 14. Adjacent to the front wall 22 the side walls are provided with recesses 23 adapted to receive rollers 24 and 25 which are rotatably mounted on the arm, for example, on bearing pins 26. A second pair of recesses or grooves 27 is formed in the arm 15 parallel to the grooves or recesses 23 of the extension 14, and suitable rollers or wheels 28 and 29 are preferably provided. The wheels or rollers 24, 25, 28 and 29 are less in diameter than the widths of the grooves 23 and 27. The wheels or rollers 28 and 29 may be journalled in any suitable manner on the side walls 21 of the upward extension 14 of the main frame of the microscope, and in the construction shown, these rollers are mounted on bearing pins formed in the ends of screws 30 secured in the side walls 21. The rollers 24 and 28 are mounted so as to bear against the front walls or faces of the grooves 23 and 27 respectively, and the rollers 25 and 29 are mounted to bear against the rear walls or faces of the grooves 23 and 27 respectively. This construction, consequently, results in a material reduction of the friction ordinarily present in bearings of this type, and thus enables the arm of the microscope to be easily raised and lowered relatively to the main frame, and there will be no tendency of the bearing to bind.

The rollers may be of any suitable or desired construction, for example, such as shown on a larger scale in Fig. 9. In order to reduce friction as much as possible, the side walls of the rollers are preferably slightly relieved or cut away as shown at 31, so that only small portions of the side walls adjacent to the bearing pins will bear either against the wall of the groove or against the screw 30, as shown in Fig. 9. Rollers of any other suitable type, such for example as balls may, of course, be provided if desired, and also bearings of any other suitable or desired construction may be employed for sliding the arm relatively to the main frame of the microscope.

33 represents a grip or guard which may be secured to the frame 12 of the microscope and to the extension 14 thereof and which facilitates lifting the microscope and protects the lower portion of the arm 15.

In my pending applications #491,931 and #491,932, filed June 23, 1943, I have shown a coarse adjustment mechanism including a rack and pinion. In the construction shown in the accompanying drawings, I have shown a coarse adjustment operated by means of a screw 35 arranged in a cylindrical bore or recess extending upwardly into the arm 15 from the lower end thereof, and at the lower end of the arm is provided a nut 37 which may be suitably secured to the lower end of the arm in any desired manner, for example, by means of screws 38. The screw 35 is held against endwise movement when the screw is turned by the coarse adjustment mechanism, and consequently, upon rotating the screw, the nut 37 and the arm 15 will be raised or lowered. A spring 36 under compression is preferably housed in a tube or sheath 39 and takes up any play or lost motion between the threads of the screw and the nut. The sheath prevents wear of the outer surfaces of the spring when the screw is rotated.

The fine and coarse adjustment mechanism are similar in construction to those disclosed in my beforementioned applications for patent and are coaxial with the inclination joint of the microscope. This joint includes a portion 41 having a portion of its periphery of cylindrical form and formed integral with the main frame 12. This cylindrical portion is mounted to oscillate in a partially cylindrical recess formed in the pedestal 11. The cylindrical portion 41 is confined in the recess of the pedestal by means of flanges 42 of tubular members 43. The flanges are secured to the main frame by any suitable means, such for example as screws 44, Fig. 7, portions of the flanges overlapping the pedestal of the microscope as clearly shown in Figs. 1 and 7. The cylindrical bearing part 41 of the main frame is hollow to receive parts of the fine and coarse adjustment mechanisms. The tubular parts 43 have extensions 45 of reduced diameter, within which hollow coarse adjustment shafts 47 are journalled. The hollow shafts 47 have disk portions or knobs 48, by means of which the coarse adjustment is actuated, and the two coarse adjustment shafts 47 are connected by means of a sleeve 50 having slots 51 in a portion thereof. A coarse adjustment bevel gear 49 has a tubular extension or sleeve 52 and suitable means such as screws 53 extend through the sleeve 52 and the sleeve 50 and enter into one of the hollow coarse adjustment shafts 47 for securing these three parts together. The other end of the slotted connecting sleeve 50 is secured to the other coarse adjustment shaft by means of screws 54 which extend through a reinforcing ring 55 and through the connecting sleeve into the coarse adjustment shaft, as clearly shown in the righthand side of Fig. 7. Consequently, when either coarse adjustment shaft is turned by means of its disk or knob 48, rotation is imparted to the bevel gear 49 which meshes with a bevel gear 57, which may be suitably connected with the coarse adjustment screw 35 in any suitable manner.

Preferably the bevel gear 57 is connected with the coarse adjustment screw by means of a suitable joint or coupling for the purpose of compensating for any eccentricity of the bevel gear with reference to the coarse adjustment screw, and in the construction shown by way of example, an Oldham type of coupling is employed for this purpose. In the construction shown, the coarse adjustment screw is provided with a downwardly extending stem which has a cylindrical lower portion 60 and a flat web portion 61 of substantially rectangular cross section, which forms a part of the coupling.

The bevel gear 57 has an upwardly extending boss or annular projection 63 formed integral therewith, and this boss has a slot 64 extending diametrically across the same, see Fig. 6. The gear 57 also has a central hole or aperture through which the lower portion 60 of the stem of the coarse adjustment screw may pass, the hole being large enough to provide ample clearance to permit lateral movement of the stem and gear relatively to each other. A bushing 65 has a downwardly extending portion or lug 66 with parallel flat sides, which fits snugly into the slot 64 of the boss 63 in such a manner that the downward extension or lug 66 may slide lengthwise in the slot 64. The bushing 65 has a slot 67, Fig. 7, extending substantially at a right angle to the slot 64 and into which the flat or web portion 61 of the downwardly extending shaft or stem of the coarse adjustment screw fits so as to slide lengthwise of the slot. As a result of this construction, it will be obvious that if the coarse adjustment screw 35 is not coaxial with the bevel gear 57, the construction described will permit turning of the screw by means of the gear without binding and without lost motion.

The slotted boss 63 of the bevel gear 57 is externally screw-threaded and a hollow bearing sleeve 68 is secured to the collar 63. This sleeve bears in a cylindrical aperture formed in the frame member 12 and a disk 69 is suitably secured to the upper end of the sleeve 68 in such a manner that the disk 69 and the bevel gear 57 engage opposite shoulders of the cylindrical bearing portion of the main frame, thus holding the bevel gear 57 against upward and downward movement. The disk 69 is provided with a slot 70 which is larger than the web portion 61 of the coarse adjustment screw which extends through this slot. An annular collar 71 is provided above the web portion 61 of the downwardly extending part of the coarse adjustment screw 35.

The fine adjustment mechanism includes a fine adjustment shaft 75 which extends through and bears in the hollow coarse adjustment shafts 47 and is provided with buttons 76 at opposite ends thereof. The fine adjustment shaft has a screw-threaded portion 77 which engages a threaded part of a fine adjustment nut 78, slidably arranged in the cylinder or tube 50 which connects the two hollow coarse adjustment shafts. The fine adjustment nut is free to move lengthwise of the connecting sleeve 50 but is held against turning relatively thereto in any suitable manner. For example in the construction illustrated, a ring 80 is provided about the connecting sleeve 50 and is slidable lengthwise of this sleeve, and screws 81 extend through the ring and through the slots 51 of the sleeve and into the fine adjustment nut 78, thus holding the fine adjustment nut against rotation relatively to the connecting sleeve 50 and transmitting lengthwise movement of the nut through the slots in the sleeve to the ring 80.

A fine adjustment bell crank lever forms a connection between the ring 80 and the downward extension 60 of the coarse adjustment screw, this lever being pivoted at 83 on the main frame of the microscope and having a bifurcated arm 84, Figs. 7 and 8. The outer ends of this arm engage the fine adjustment ring 80. The lever has a shorter arm 85 on which the downwardly extending portion 60 of the coarse adjustment screw rests. In order to hold this end of the coarse adjustment screw in contact with the short arm 85 of the fine adjustment lever, yielding downward pressure is exerted on the coarse adjustment screw, for example, by means of another lever 86 pivoted at 87 on the main frame of the microscope and a tension spring 88, connected at its upper end to the lever 86. This spring extends into an aperture formed in the cylindrical part 41 of the main frame and is secured at its lower end to this part 41 of the main frame. The outer end of this lever engages the disk 71 of the coarse adjustment screw, and consequently, the spring 88 causes the lever 86 to exert a downward pressure on the coarse adjustment screw, thus holding the lower end of the extension 60 of this screw in engagement with the arm 85 of the fine adjustment lever.

In the operation of the adjusting mechanisms, it will be obvious that if either of the coarse adjustment buttons or disks 48 is rotated to effect coarse adjustment of the arm 15 of the microscope, rotation of the buttons will be transmitted through the gears 49 and 57 to the coarse adjustment screw, thus raising or lowering the arm of the microscope by rotation of the screw. During the rotation of the coarse adjustment buttons 48, the fine adjustment shaft 75 and nut 78 will turn with the coarse adjustment shafts so that no lengthwise movement of the fine adjustment nut results. When, however, either of the fine adjustment buttons 76 is turned to actuate the fine adjustment shaft 75, the coarse adjustment mechanism remains stationary and the fine adjustment nut 78 is moved lengthwise in the connecting sleeve 50, thus causing the fine adjustment lever to swing about its pivot 83 to raise or lower the arm 15 of the microscope through the medium of the coarse adjustment screw. In other words, the coarse adjustment is produced by rotating the coarse adjustment screw and the fine adjustment is effected by moving this screw lengthwise.

It will be noted from the construction described that both the fine and coarse adjustment shafts are mounted to rotate substantially concentrically about the axis of the inclination joint of the microscope and are located well below the level of the stage 19, so that an operator in manipulating the adjustment buttons may do so while his hand rests on the table or support on which the microscope is positioned.

By locating the adjustment buttons concentric with the axis of inclination, it also follows that these buttons will remain in constant position with reference to the base of the microscope, so that they can always be readily found by the user of the microscope without taking his eyes from the body tube. The construction described also results in the advantage that only a single slide bearing is necessary between the arm and the main frame of the microscope, since both fine and coarse adjustments are made along the same slide bearing.

I preferably also provide the microscope with a new and improved sub-stage construction. In the construction shown for this purpose in Fig. 1, a slide member 89 is mounted to slide in a suitable bearing of the main frame 12, being adjustable vertically by means of one or more sub-stage buttons 100 in any suitable or desired manner. The slide 89 is provided with means for quickly attaching and replacing a condenser 20 and other sub-stage parts, and for this purpose, I provide a bracket member 90 detachably mounted on the slide 89 and having a ring or fork 91 for supporting the condenser 20. The part of the bracket which is detachably mounted on the slide member preferably has an upwardly extending flange 92 which is adapted to fit into and engage with an overhanging hook-shaped or flanged portion 93, as clearly shown in Fig. 1. The bracket member 90 also has a downwardly extending portion or flange 94 which may rest on an outwardly extending projection 95 of the slide. The flange 93 of the slide cooperates with the upwardly extending flange 92 of the bracket so that when these parts are in correct engagement, the flat upright face of the bracket member 90 engages the adjacent flat face of the slide 89 for securely holding the bracket 90 in place. If desired, means may be provided for releasably locking the bracket member in place, such for example as one or more plungers 96, each of which may extend through a hole in the extension 95 of the slide member and is yieldingly urged upwardly by means of a leaf spring 97 mounted on the lower face of the slide 89. The upper end of the plunger 96 enters into a hole or recess in the underface of the downwardly extending flange 94 as indicated by broken lines in Fig. 1. When this plunger is in the position shown in Fig. 1, the bracket 90 is securely held in place on the slide 89. If it is desired to release the bracket member from the slide, the spring 97 is depressed, thus withdrawing the plunger 96 from the hole or recess in the bracket member. Assuming that the slide 89 is in a lower position than shown in Fig. 1, the bracket member and the parts mounted thereon may be readily removed from the slide by swinging the bracket member upwardly so that the downwardly extending flange or part 94 moves out of engagement with the extension 95 of the slide member, whereupon this bracket member may be lowered to withdraw the upwardly extending flange 92 of the bracket out of engagement with the flange 93 of the slide member.

98 represents the usual mirror which may be mounted by means of a bracket 99 on the extension 95 of the slide member 89.

In Figs. 10 to 12 I have illustrated another quick detachable mounting for substage parts. In this construction a slide 105 is provided which may be adjusted vertically on the main frame 12 by a suitable means operated by a substage adjustment button 106. 107 represents a bracket member which is detachably mounted on the slide and which may carry a condenser 20 and other substage parts. This bracket member has an upwardly extending flange or lip 108 and a downwardly extending part 109, both of which parts may be detachably connected with the slide 105. The downwardly extending part 109 may, for example, be provided with a notch or recess 110 in the middle portion of the lower edge thereof, which may straddle and rest upon an outwardly extending saddle portion or cylindrical part 111 of the slide member, and be held in place by means of a flange 112 at the outer end of the cylindrical saddle 111. The saddle and flange serve not only to center the supporting bracket with reference to the slide, but also to securely hold the downwardly extending portion 109 in correct relation with reference to the slide.

The upward extension or flange 108 may be detachably held in place in any suitable manner, for example, by means of a spring actuated latch 114, the leaf spring portion 115 of which may be held on the upper surface of the slide by means of screw 116. The latch or detent thus holds the bracket 107 on the slide, and if the latch is raised, the supporting bracket 107 may swing downwardly and the portion 109 thereof may be raised to clear the flange 112. By means of this construction, the slide 105 need not be lowered to the same extent as in the construction shown in Fig. 1, in order to release the supporting bracket for the substage parts.

Means may be provided for unlatching the supporting bracket 107 from the slide, and in the construction shown for this purpose, I have provided a cam lever 118 pivoted on screw 119 secured in the slide 105. The cam surface of the lever is such that if the arm 120 of the lever is swung downwardly from the positions shown in Figs. 11 and 12, the cam will engage the spring 115 of the latch 114 and lift the same upwardly so that the latch will be out of engagement with the flange 108 of the supporting bracket 107.

Suitable means are also preferably provided for cooperation with the notch 110 and its saddle 111 to center the bracket 107 so that the same will be properly located with relation to the slide, and in the particular construction illustrated by way of example, I have provided the screw 119 with an extension 121 which is shaped to fit into a hole 121a formed in the upright portion of the supporting bracket 107. Consequently, when the bracket is to be mounted on the slide 105, the part 109 is first placed into engagement with the saddle 111 of the slide in such a manner that the recess 110 therein straddles the saddle. At the same time the extension 121 of the screw is fitted into the hole 121a. The bracket 107 is then swung upwardly so that the upper portion or extension 108 is engaged by the latch 114 as shown in Fig. 10. Any other suitable means may be provided for correctly locating the bracket with the relation to the slide.

The screw 119 preferably has an annular collar 122 which is seated in a similarly shaped recess in the cam lever 118 so that the lever remains in its operative position in the recess in the slide when the bracket is removed. 125 represents a mirror which is mounted on a bracket having a stud portion 126 which engages in a correspondingly threaded hole formed in projection of the slide which also forms the saddle 111 and flange 112. Any other means for mounting the mirror on the slide may be used.

In both of the two attaching means for the substage support, one end of the upright end portion of the bracket is hooked into a part of the slide at one end thereof while the other end swings into and out of locking position.

The microscope described has the advantage that only one bearing is required between the arm and the frame and both fine and coarse adjustments are affected along this bearing. This makes it possible to provide a sturdier and more accurate bearing. The structure described provides for both fine and coarse adjustment buttons to be located below the level of the stage of the microscope so that the user of the microscope may rest his hands on the table or support on which the microscope stands, which avoids fatiguing the operator and also facilitates accurate adjustments of the arm.

I claim as my invention:

1. In a microscope having a body tube supporting arm having a bearing connection with the frame of the microscope, the combination of a screw engaging a threaded part on said arm, said arm having a bored out portion parallel to said bearing into which said screw extends, a coarse adjustment mechanism for rotating said screw, a fine adjustment mechanism including a part on which said screw bears while turning, to hold said screw against endwise movement, and means for adjusting said part to move said screw endwise for effecting fine adjustment of said body tube, said screw being hollow and open at the upper end thereof, and a coil spring in said hollow screw and bearing against said arm and urging said screw lengthwise relatively to said threaded part of said arm.

2. A microscope according to claim 1 and having a sheath arranged about said spring to prevent wear of the spring when said screw is rotated.

3. In a microscope having a body tube supporting arm adjustably mounted on the frame of the microscope to move the body tube toward and from a specimen, the combination of a screw engaging a threaded part of said arm and having a downwardly extending stem portion, a gear rotatably mounted on said frame and having a spline connection with said stem portion for turning said screw and permitting lengthwise movement of the same relatively to said gear, a coarse adjustment mechanism including a horizontal shaft and means connecting said shaft with said gear for turning said screw, and a fine adjustment mechanism including a part on which said stem of said screw rests, and means for moving said part for effecting fine adjustment of said arm.

4. In a microscope having a body tube supporting arm adjustably mounted on the frame of the microscope to move the body tube toward and from a specimen, the combination of a screw engaging a threaded part of said arm and having a downwardly extending stem, a hollow coarse adjustment shaft, having coarse adjustment buttons on opposite ends thereof, a bevel gear on said coarse adjustment shaft and meshing with a bevel gear splined to said stem for rotating said screw, and relatively to which said stem is movable lengthwise, a fine adjustment shaft coaxial with said coarse adjustment shaft and having a threaded portion, a nut movable lengthwise of said fine and coarse adjustment shafts when said fine adjustment shaft is turned, and a lever connected with said nut and having an arm on which said stem rests, said lever being moved by said nut for adjusting said stem and screw lengthwise for fine adjustment of said arm.

5. In a microscope having a body tube supporting arm adjustably mounted on the frame of the microscope to move the body tube toward and from a specimen, the combination of a screw engaging a threaded part of said arm and having a downwardly extending stem provided with a transversely extending web portion, a coarse adjustment shaft, gearing rotatable by said coarse adjustment shaft, a coupling connecting said gearing and said web portion of said stem and relatively to which said stem is movable in the direction of its length, and fine adjustment mechanism including a part on which said stem bears to hold said screw and stem against lengthwise movement while rotated by said coarse adjustment mechanism, and means for moving said part for adjusting said stem and screw in the direction of their length for effecting fine adjustment of said arm.

6. A microscope including a body tube supporting arm, a frame on which said arm is slidable, fine and coarse adjustment shafts, a coarse adjustment screw having a threaded engagement with said arm for moving said arm relatively to said frame when said screw is turned, means directly connecting said screw and said coarse adjustment shaft for turning said screw including a gear secured on said coarse adjustment shaft and meshing with a gear journalled in said frame and having a central hole, said screw having a stem extending downwardly through said hole, a splined connection between said gear and said stem and means connected with said fine adjustment shaft on which the lower portion of said stem bears and which is adjustable to move said screw in the direction of its axis to effect fine adjustment of said screw.

7. A microscope including a body tube supporting arm, a frame on which said arm is slidable, fine and coarse adjustment shafts, a coarse adjustment screw having a threaded engagement with said arm for moving said arm relatively to said frame when said screw is turned, means connecting said screw and said coarse adjustment shaft for turning said screw including a gear mounted on said shaft, a gear rotatably mounted on said frame and meshing with said gear on said shaft and an Oldham type of coupling connecting said last mentioned gear and said screw and having a hole extending through the same substantially coaxial therewith, said screw having a stem extending downwardly through said hole, and means connected with said fine adjustment shaft on which the lower portion of said stem of said screw bears and which is adjustable to move said screw in the direction of its axis to effect fine adjustment of said arm.

8. A microscope including a base having an upwardly extending pillar provided with a cylindrical bearing surface, a main frame having a hollow body having its outer surface cylindrical and formed to cooperate with the cylindrical surface of said pillar to form an inclination joint, a body tube supporting arm slidably mounted on said main frame, tubular flanged members secured to said main frame and cooperating with said pillar to hold said partially cylindrical portions of said pillar and said main frame in operative relation to each other against endwise movement and having outwardly extending bearing parts, fine and coarse adjustment shafts journalled in said bearing parts of said flanged members, and means connecting said fine and coarse adjustment shafts with said arm for adjusting the same relatively to said frame.

9. A microscope in accordance with claim 8, in which the fine and coarse adjustment shafts are mounted coaxially with the axis of said outer cylindrical surface of said main frame, whereby the axes of the fine and coarse adjustment shafts remain in fixed position relatively to said base while said main frame is swung about the inclination joint.

10. In a microscope having a body tube supporting arm adjustably mounted on the frame of the microscope to move the body tube toward and from a specimen, the combination of a screw engaging a threaded part of said arm, and having a downwardly extending stem provided with a laterally extending web portion, a hollow coarse adjustment shaft, a bevel gear mounted on said shaft, a second bevel gear meshing with said first bevel gear and arranged to rotate about said downwardly extending stem of said screw, and Oldham type coupling connecting said last mentioned gear with said web portion of said stem for transmitting rotation of said last mentioned stem to said screw, said stem of said screw being movable vertically relatively to said coupling and said last mentioned gear, and fine adjustment mechanism including a part on which said stem rests to hold said screw against endwise movement while being turned by said coarse adjustment, and fine adjustment mechanism for moving said part for effecting fine adjustment of said arm.

11. A microscope including a body tube supporting arm, a main frame having a stage supported thereon, a single bearing connecting said frame and arm and along which said arm is adjustable to move the body tube toward and from said stage, a screw pivotally mounted on said main frame and engaging a threaded part of said arm, means for turning said screw for effecting adjustment of said arm relatively to said frame along said bearing, including a coarse adjustment shaft lying in a plane in which the axis of said screw lies, a bevel gear on said shaft meshing with a bevel gear journalled on said frame substantially coaxial with said screw and having a splined connection with said screw, and fine adjustment means for moving said screw in the direction of its length relatively to said frame and said last mentioned bevel gear for moving said arm along said bearing.

HARVEY N. OTT.

REFERENCES CITED

The following references are of record in the file of this patent:

UNITED STATES PATENTS

| Number | Name | Date |
| --- | --- | --- |
| 528,211 | Sedgwick | Oct. 30, 1894 |
| 1,933,386 | Ott | Oct. 31, 1933 |
| 2,148,576 | Ott | Feb. 28, 1939 |
| 1,505,418 | Ott | Aug. 19, 1924 |
| 1,891,052 | Ott | Dec. 13, 1932 |
| 2,003,387 | Ott | June 4, 1935 |
| 2,028,718 | Heine | Jan. 21, 1936 |
| 2,093,611 | Kurtz | Sept. 21, 1937 |
| Re. 21,587 | Gallasch et al. | Oct. 1, 1940 |

FOREIGN PATENTS

| Number | Country | Date |
| --- | --- | --- |
| 369,595 | Germany | Feb. 21, 1938 |
| 107,245 | Austria | Sept. 10, 1927 |
| 140,938 | Austria | Mar. 11, 1935 |